United States Patent [19]
Stavinoha et al.

[11] 4,378,251
[45] Mar. 29, 1983

[54] POLYMER PREPARED FROM OCTADIENOL AND UNSATURATED DICARBOXYLIC ACID, PROCESS OF PREPARING THE SAME, AND COATING COMPOSITION PREPARED THEREFROM

[75] Inventors: Jerome L. Stavinoha; Anthony W. McCollum, both of Longview, Tex.

[73] Assignee: Eastman Kodak Company, Rochester, N.Y.

[21] Appl. No.: 324,233

[22] Filed: Nov. 23, 1981

[51] Int. Cl.$^3$ .................................. C07G ; C08H ; C09K
[52] U.S. Cl. .................. 106/287.18; 526/90; 526/172
[58] Field of Search ............. 106/287.18; 526/90, 526/172

[56] References Cited
U.S. PATENT DOCUMENTS

| | | | |
|---|---|---|---|
| 2,952,556 | 9/1960 | Gast et al. | 106/287.18 |
| 3,157,525 | 11/1964 | Braun | 106/287.18 |
| 3,826,669 | 7/1974 | Antlfinger et al. | 106/287.18 |

Primary Examiner—Lucille M. Phynes
Attorney, Agent, or Firm—David E. Cotey; Daniel B. Reece, III

[57] ABSTRACT

The present invention provides a relatively low molecular weight polymer comprising units derived from an unsaturated dicarboxylic acid and units derived from octadienol. The polymer exhibits a fluid viscosity of at least about 200 cp when measured in the neat state at room temperature using a Brookfield viscosimeter. The unsaturated dicarboxylic acids from which the polymer units are derived include fumaric acid, maleic acid, and mixtures thereof. The octadienol from which the polymer units are derived commonly comprises a mixture of 2,7-octadien-1-ol and 1,7-octadien-3-ol. Preferably, the polymer exhibits a fluid viscosity of about 700–900 cp. The process for preparing the polymer comprises reacting octadienol with an unsaturated dicarboxylic acid selected from fumaric acid, maleic acid, lower alkyl diesters of said acid, and mixtures thereof in the presence of an esterification catalyst. Preferably, the esterification catalyst comprises dibutyltin oxide and is present in an amount of about 0.01 to 1% by weight. The coating composition provided by the present invention comprises the relatively low molecular weight polymer together with a promoter system comprising organic salts of cobalt and manganese. The promoter system is present in the composition in a concentration such that the weight of metal in the promoter system is about 0.01 to 0.5% of the weight of polymer. The coating composition may further comprise one or more additives selected from pigments, anti-skinning agents, flow control agents, solvents, propellants, additional polymeric resins, and other additives well known in the art.

6 Claims, No Drawings

POLYMER PREPARED FROM OCTADIENOL AND UNSATURATED DICARBOXYLIC ACID, PROCESS OF PREPARING THE SAME, AND COATING COMPOSITION PREPARED THEREFROM

BACKGROUND OF THE INVENTION

The present invention relates to the preparation of new compositions of matter which are useful in low temperature curable coatings. More specifically, the invention relates to the preparation of polymeric materials derived from dioctadienyl fumarate, dioctadienyl maleate, and mixtures thereof and the use of these materials in novel coating systems which are curable at 180°-200° F.

U.S. Pat. No. 3,746,749 discloses the preparation of octadienyl esters of carboxylic acids from butadiene and a suitable carboxylic acid. Fumaric acid is listed as a suitable carboxylic acid. The patent does not disclose either the preparation of polymers from such octadienyl esters or the use of such polymers in coating compositions.

The present invention provides polymers derived from dioctadienyl fumarate, dioctadienyl maleate, and mixtures thereof which are useful in low temperature curable coating compositions. The invention further provides a one-step process for preparing such polymers from octadienol and fumaric acid, maleic acid, maleic anhydride, lower alkyl esters of such acids, or mixtures of the foregoing. The coating compositions which are prepared from such polymers are curable at low temperatures of 180°-200° F. and are harder and more solvent resistant than current, commercially available coating compositions, such as alkyd resins.

SUMMARY OF THE INVENTION

In one aspect, the present invention provides a relatively low molecular weight polymer comprising units derived from an unsaturated dicarboxylic acid selected from fumaric acid, maleic acid, and mixtures thereof and units derived from octadienol, said polymer exhibiting a fluid viscosity of at least about 200 cp when measured in the neat state at room temperature using a Brookfield viscosimeter.

The present invention provides in another aspect a process for producing a relatively low molecular weight polymer of a compound selected from dioctadienyl fumarate, dioctadienyl maleate, and mixtures thereof. The process comprises reacting octadienol with an unsaturated dicarboxylic acid or derivative thereof selected from fumaric acid, maleic acid, maleic anhydride, lower alkyl diesters of said acid, and mixtures thereof in the presence of an esterification catalyst.

In another aspect, the present invention provides a low temperature curable coating composition comprising (a) a relatively low molecular weight polymer comprising units derived from an unsaturated dicarboxylic acid selected from fumaric acid, maleic acid, and mixtures thereof and units derived from octadienol, the polymer exhibiting a fluid viscosity of at least about 200 cp when measured in the neat state at room temperature using a Brookfield viscosimeter, and (b) a promoter system comprising organic salts of cobalt and manganese, the promoter system being present in said composition in a concentration such that the weight of metal in the promoter system is about 0.01 to 0.5% of the weight of polymer.

DETAILED DESCRIPTION OF THE INVENTION

The present invention relates to the preparation of polymers of dioctadienyl fumarate, dioctadienyl maleate, and mixtures thereof. These materials are useful in the preparation of low temperature curable coating compositions.

The polymers which comprise the subject matter of the present invention are relatively low molecular weight polymers having units derived from an unsaturated dicarboxylic acid selected from fumaric acid, maleic acid, and mixtures thereof and units derived from octadienol. Preferably, the acid units are derived from fumaric acid. The octadienol from which the polymer is derived commonly comprises a mixture of 2,7-octadien-1-ol and 1,7-octadien-3-ol.

The subject polymer has a relatively low molecular weight as indicated by its fluid viscosity. The polymer exhibits a fluid viscosity of at least about 200 cp when measured in the neat state at room temperature using a Brookfield viscosimeter. By way of comparison, the corresponding monomeric compounds exhibit a fluid viscosity of less than about 100 cp. Commonly, the polymer exhibits a fluid viscosity of about 200-30,000 cp. While it is possible to obtain higher viscosities (i.e., higher molecular weights), polymers having a higher viscosity tend to be in the form of a gel rather than a fluid. It is far more desirable to process and handle the polymer as a fluid rather than in the form of a gel. In preferred embodiments, the polymer exhibits a fluid viscosity of about 700-900 cp.

The present invention further provides a process for producing the above-described polymers by a one-step method directly from octadienol and the appropriate unsaturated dicarboxylic acid, lower alkyl diesters of such acids, or mixtures thereof. The process comprises reacting octadienol in the presence of an esterification catalyst with an unsaturated dicarboxylic acid or derivative thereof selected from fumaric acid, maleic acid, maleic anhydride, lower alkyl diesters of such acids, or mixtures thereof. As discussed above, the octadienol commonly comprises a mixture of 2,7-octadien-1-ol and 1,7-octadien-3-ol.

The lower alkyl diesters of fumaric acid and maleic acid which are useful in the process of the present invention contain alkyl groups of 1-4 carbon atoms. Preferably, the alkyl groups of the lower alkyl diesters are methyl groups. In especially preferred embodiments, the reactant which yields polymer units derived from unsaturated dicarboxylic acid is selected from fumaric acid (direct esterification) or dimethyl fumarate (transesterification).

The esterification catalyst which is useful in the process of the present invention can be selected from any of the esterification catalysts which are well known in the art. Examples of such catalysts include tetraisopropyl titanate, dibutyltin oxide, lithium hydroxide, lithium alkoxide, etc. The preferred esterification catalyst is dibutyltin oxide. The esterification catalyst is commonly employed in an amount of about 0.01 to 1.0% by weight, based upon the weight of the reactants. Preferably, the esterification catalyst is employed in an amount of about 0.1 to 0.5% by weight, based upon the weight of the reactants.

The reactants are provided to the process of the present invention in a molar ratio of octadienol:diacid, or lower alkyl diester thereof, of greater than about 2:1. That is, there is at least a slight molar excess of the octadienol reactant. Preferably, the molar ratio of octadienol:diacid, or lower alkyl diester thereof, is about 2.1:1 to 3:1.

The process of the present invention is conveniently conducted at a temperature of about 140°–200° C. for a period of time of about 2–15 hours. Preferably, the reaction is conducted at a temperature of about 170°–195° C.

The molecular weight of the product prepared by the process of the present invention can be readily controlled by the selection of appropriate parameters. The molecular weight of the product depends upon such factors as the temperature at which reaction is conducted, the period of time for which reaction is conducted, the ratio of the reactants, the choice of the reactants, the relative concentrations of octadienol isomers, etc. The selection of an optimal combination of parameters will be apparent to one of ordinary skill in the art. As discussed above, the fluid viscosity, being an indicator of molecular weight, will be at least 200 cp, preferably 200–30,000 cp, and more preferably about 700–900 cp.

While not wishing to be bound by theoretical considerations, it appears that at least three separate chemical reactions occur during the process of the present invention. These reactions are illustrated below:

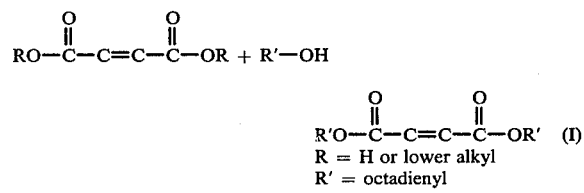

R = H or lower alkyl
R' = octadienyl

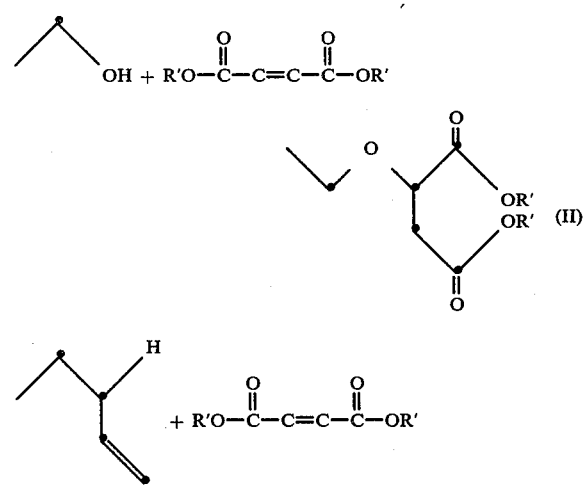

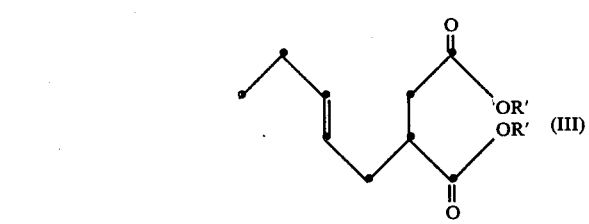

Equation I illustrates the esterification reaction which takes place between the diacid or diester thereof and octadienol. After formation of the diester had commenced, a competing reaction can occur whereby free octadienol adds on to the ester through the double bond of the acid unit. This type of reaction is commonly referred to as a Michael reaction and is represented by Equation II. It can readily be seen that this reaction competes with the esterification reaction for free octadienol.

Another reaction which can occur following commencement of formation of ester molecules is represented by Equation III and is commonly known as an "ene" reaction. In this reaction, the octadienol units, whether free or bound by an ester linkage, rearrange and add on to an ester group through the acid unit double bond.

Thus, Equation I represents the formation of the ester groups, while Equations II and III represent the chain propagation reactions. The polymer is an addition polymer, formed by reactions involving the double bond of the acid unit. The process of the present invention provides a one-step method for preparing the polymers whereby ester formation and chain propagation occur during a single process step.

By removing excess octadienol subsequent to an initial period of esterification and polymerization, chain propagation can be enhanced, and the molecular weight and viscosity of the product can be increased. The octadienol can be conveniently removed by flash distillation at elevated temperature, e.g., 140°–170° C. and reduced pressure (e.g., 5–25 torr). Subsequent to removal of excess octadienol, further chain propagation is effected by again heating the reaction mixture under the initial polymerization conditions.

The product prepared by the process described above can be used in the preparation of a low temperature curable coating composition. The coating composition comprises the relatively low molecular weight polymer which has been described above and which is prepared by the process of the present invention in combination with a promoter system comprising organic salts of cobalt and manganese. The promoter system is present in the composition in a concentration such that the weight of metal in the promoter system is about 0.01 to 0.5% of the weight of polymer. Preferably, the promoter system comprises cobalt naphthenate and manganese octoate, each component being present in the composition in a concentration such that the composition comprises about 0.03% by weight, based upon the weight of polymer, of each of cobalt and manganese.

The coating composition may further include one or more additives such as pigments, anti-skinning agents, flow control agents, solvents, propellants, additional polymeric resins, etc. Such additives are well-known in the art. Examples of suitable solvents include aromatic solvents, such as benzene, toluene, the isomeric xylenes, etc., ketone solvents, such as methylethyl ketone, methyl n-amyl ketone, etc., and others. Suitable flow control additives include Fluorad FC-430, available from the 3M Company, L-5310, available from Union Carbide Corporation, etc. A preferred pigment is titanium dioxide R-900, available from Du Pont. Additional resins which may be added to the coating composition of the present invention include well-known alkyd resins. Such resins may be added in amounts up to about 50% by weight, based upon the weight of the total composition. Other suitable additives will be apparent to those of ordinary skill in the art.

The coating composition provided by the present invention is capable of being cured at temperatures of 180°–210° F. in a period of time of about 20 to 30 minutes. The ability of the composition to cure at such relatively low temperatures in a reasonable length of time is surprising and unexpected. For example, current commercially available alkyd resins must be cured for 20 minutes at temperatures of at least about 250° C. Such resins often require temperatures in the range of 325°–350° C. for curing within a reasonable length of time.

The coatings obtained from the coating composition of the present invention are useful in the field of general metal coating and in any application where an appearance coating is desired. Typical applications include furniture, fence posts, toys, etc. The coatings obtained from the coating composition of the present invention exhibit increased hardness and solvent resistance over such commercially available resins as the alkyd resins.

This invention will be further illustrated by the following Examples although it will be understood that these Examples are included merely for purposes of illustration and are not intended to limit the scope of the invention.

EXAMPLE 1

This Example illustrates the preparation of dioctadienyl fumarate polymer by direct esterification and the preparation of a coating composition therefrom.

A mixture of fumaric acid (69 grams, 0.59 mole), octadienol (213 grams, 1.69 mole) and dibutyltin oxide (0.43 grams) was provided to a resin cook apparatus. The octadienol comprised 88 mole percent 2,7-octadien-1-ol and 12 mole percent 1,7-octadien-3-ol. The reaction mixture was stirred and heated for 4.5 hours at 185°–195° C. A total of 21.7 g of $H_2O$ was collected in a Dean-Stark trap over this period. The mixture was then heated at 160°–165° C. for one hour at 7–8 mm Hg to remove excess octadienol. The product exhibited an acid number of 26.2 and a viscosity of 6260 cp at 77° C.

Titanium dioxide pigment (Du Pont R-900) was added to the polymeric product in a ratio of 41 parts by weight of pigment to 50 parts by weight of polymer. Toluene solvent was added to give a coating composition having 76 weight percent solids. The mixture was ball-milled for 16 hours. Cobalt naphthenate (0.03% by weight of cobalt in the composition, based upon the weight of the polymer) and manganese octoate (0.03% by weight of manganese in the composition, based upon the weight of the polymer) were then added. The resulting formulation was spray-applied onto cold rolled steel panels treated with Bonderite 1000. The coated steel panels were cured in a forced air oven at 185° F. for 20 minutes. The coatings were evaluated one week after curing. The properties are given in Table I.

TABLE I

| | |
|---|---|
| Thickness (mils) | 1.3–1.5 |
| Pencil Hardness | H-2H |
| MEK Double Rubs | 250+ |
| Impact Resistance (Forward/Reverse, in.-lb.) | 25/<5 |
| ⅛-Inch Conical Mandrel | Fail |
| $I_2$ Stain (30 min/5 min; 10 = none) | 4/5 |
| Cleveland Humidity (24 hr. at 140° F.) | |
| Gloss Retention, % | 95 |

TABLE I-continued

| | |
|---|---|
| Blistering | Very Slight No. 9 |
| | Some Yellowing |

It can readily be seen from the data of Table I that the coating composition of the present invention provides a coating having excellent hardness and solvent resistance. Such properties are unexpected from a coating composition which is curable at the low temperatures involved in the curing of the composition of the present invention.

EXAMPLE 2

This Example illustrates the preparation of a polymer of dioctadienyl fumarate by transesterification according to the process of the present invention.

A mixture of dimethyl fumarate (36 grams, 0.25 mole), 2,7-octadien-1-ol (67 grams, 0.53 mole), and dibutyltin oxide (0.2 gram) was stirred in a resin cook apparatus and heated as follows: to 140° C. over a period of 45 minutes, at 140°–170° C. for 45 minutes, at 170°–190° C. for one hour, and at 195° C. for one hour. During the heating and stirring, 15.0 g of methanol was collected (94% of the theoretical yield). The product was then heated at 170° C. at a pressure of 10 torr for 1.25 hours to remove excess octadienol and methyl octadienyl fumarate. The resulting product had a viscosity of 215 cp when measured at room temperature.

EXAMPLE 3

The present Example illustrates the preparation of a polymer of dioctadienyl maleate by the process of the present invention and the preparation of a coating composition therefrom.

Into a resin cook apparatus were charged 24.5 g (0.25 mole) of maleic anhydride, 85 g (0.67 mole) of octadienol, and a catalytic amount of dibutyltin oxide. The mixture was heated at 190°–195° C. for 11 hours. Excess octadienol was flash distilled at 155° C. and a pressure of 15 torr. The product exhibited an acid number of 25 and a viscosity of 5650 cp when measured at room temperature. A coating composition was prepared by adding cobalt naphthenate and manganese octoate to the polymer product in the manner and concentrations specified in Example 1. The composition was spray applied as 80 weight percent solids in toluene to a Bonderite 1000 treated steel panel. The coated panel was cured at 210° F. for 20 minutes. The coatings were evaluated one week after curing. The results are given in Table II.

TABLE II

| | |
|---|---|
| Thickness, mils | 1.5 |
| Pencil Hardness | HB |
| MEK Double Rubs | 54 |
| Impact Resistance (F/R; in.-lb.) | 15/<5 |
| ⅛-Inch Conical Mandrel | Fail |

The data of Table II indicate that coating compositions obtained from maleic acid or derivatives thereof are not as advantageous as those obtained from fumaric acid or derivatives thereof. However, the coating compositions which include a polymer of dioctadienyl maleate do exhibit a significant degree of hardness.

EXAMPLE 4

This Example illustrates the preparation of a polymer of dioctadienyl maleate according to the process of the present invention and the preparation of a coating composition therefrom.

A mixture of maleic anhydride (15.7 g, 0.16 mole), octadienol (48.5 g, 0.38 mole), p-xylene (40 grams) and a catalytic amount of dibutyltin oxide was heated at reflux for 13.5 hours. Water was removed by means of a Dean Stark trap. Excess octadienol and xylene were flash distilled at a temperature of 150° C. and at a pressure of 10 torr. The acid number of the product was 21.6 and the viscosity was 18.5 cp when measured at room temperature. The product was then heated at 180° C. for four hours. The resulting product exhibited a viscosity of 218 cp.

A coating composition was prepared by adding cobalt naphthenate and manganese octoate to the polymer product in the manner and concentrations specified in Example 1. The composition was spray applied as 80% solids in toluene to a treated steel panel. The coating was cured at 180° F. for 30 minutes. The properties of the coating were measured one week after curing, and the results are given in Table III.

TABLE III

| | |
|---|---|
| Thickness, mils | 1.0 |
| Pencil Hardness | F |
| MEK Double Rubs | 65–70 |
| Impact Resistance (F/R; in.-lb.) | 20/<5 |
| ⅛-Inch Conical Mandrel | Fail |

Again, the data indicate that a coating composition of substantial hardness and solvent resistance was obtained.

The invention has been described in detail with particular reference to preferred embodiments thereof, but it will be understood that variations and modifications can be effected within the spirit and scope of the invention.

We claim:

1. A low temperature curable coating composition comprising
   (a) a relatively low molecular weight polymer comprising units derived from an unsaturated dicarboxylic acid selected from fumaric acid, maleic acid, and mixtures thereof and units derived from octadienol, said polymer exhibiting a fluid viscosity of at least about 200 cp when measured in the neat state at room temperature using a Brookfield viscosimeter, and
   (b) a promoter system comprising organic salts of cobalt and manganese, the promoter system being present in said composition in a concentration such that the weight of metal in the promoter system is about 0.01 to 0.5% of the weight of polymer.

2. The coating composition of claim 1 wherein the promoter system comprises cobalt naphthenate and manganese octoate, each component being present in the composition in a concentration such that the composition comprises about 0.03% by weight, based upon the weight of polymer, of each of cobalt and manganese.

3. The coating composition of claim 1 which further comprises one or more additives selected from pigments, anti-skinning agents, flow control agents, solvents, propellants, and/or additional resins.

4. The coating composition of claim 1 wherein said composition is capable of being cured by heating at 180° to 210° F. for a period of time of about 20 to 30 minutes.

5. The coating composition of claim 1 wherein said octadienol comprises a mixture of 2,7-octadien-1-ol and 1,7-octadien-3-ol.

6. The coating composition of claim 1 wherein said unsaturated dicarboxylic acid is fumaric acid.

* * * * *